United States Patent
Foley (10) Patent No.: US 9,048,475 B2
(45) Date of Patent: Jun. 2, 2015

(54) METHOD FOR THE DETECTION OF FUEL CELL SYSTEM SHORT CIRCUITS

(71) Applicant: GM Global Technology Operations LLC, Detroit, MI (US)

(72) Inventor: Robert S. Foley, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 359 days.

(21) Appl. No.: 13/759,128

(22) Filed: Feb. 5, 2013

(65) Prior Publication Data

US 2014/0220465 A1   Aug. 7, 2014

(51) Int. Cl.
*H01M 8/04* (2006.01)

(52) U.S. Cl.
CPC ...... *H01M 8/04664* (2013.01); *H01M 8/04537* (2013.01); *H01M 8/04559* (2013.01); *H01M 8/04589* (2013.01); *H01M 8/04679* (2013.01); *H01M 2250/20* (2013.01); *Y02E 60/50* (2013.01); *Y02T 90/32* (2013.01)

(58) Field of Classification Search
CPC ...... H01M 8/046; H01M 8/048; H01M 8/049
USPC ................................................ 429/431–432
See application file for complete search history.

(56) References Cited

U.S. PATENT DOCUMENTS 5,624,768 A * 4/1997 Tanokura ...................... 429/431

* cited by examiner

*Primary Examiner* — Kenneth Douyette
*Assistant Examiner* — James Lee
(74) *Attorney, Agent, or Firm* — Dinsmore & Shohl LLP (57) ABSTRACT

An apparatus and method to detect a short circuit event in a fuel cell system of a vehicle. The detection relies on three existing sensors within the fuel cell system, two current sensors and a voltage sensor. A controller executes an algorithm with a set of thresholds stored in a computer readable medium to monitor the sensors to sense if any of the threshold values are crossed. If crossed, the controller may take remedial action to stop the short circuit and/or prevent damage to the fuel cell system. A mode manager may work with the controller to determine when the operating conditions of the fuel cell system are ideal for sensing for a low voltage condition indicative of a short circuit event. A pair of integrators may be electrically coupled to an alternating current sensor to differentiate a short circuit event from a high frequency resistance current.

20 Claims, 6 Drawing Sheets

METHOD FOR THE DETECTION OF FUEL CELL SYSTEM SHORT CIRCUITS

BACKGROUND

Electrochemical conversion cells, commonly referred to as fuel cells, produce electrical energy by processing reactants, for example, through the oxidation and reduction of hydrogen and oxygen. Hydrogen is a very attractive fuel because it is clean and it can be used to produce electricity efficiently in a fuel cell. The automotive industry has expended significant resources in the development of hydrogen fuel cells as a source of power for vehicles. Vehicles powered by hydrogen fuel cells would be more efficient and generate fewer emissions than today's vehicles employing internal combustion engines.

In many fuel cell systems, hydrogen or a hydrogen-rich gas is supplied through a flowpath to the anode side of a fuel cell while oxygen (such as in the form of atmospheric oxygen) is supplied through a separate flowpath to the cathode side of the fuel cell. An appropriate catalyst (for example, platinum) is typically disposed to form on these respective sides an anode to facilitate hydrogen oxidation and as a cathode to facilitate oxygen reduction. From this, electric current is produced with high temperature water vapor as a reaction byproduct. In one form of fuel cell, called the proton exchange membrane or polymer electrolyte membrane (in either event, PEM) fuel cell, an electrolyte in the form of an ionomer membrane is situated between the anode and cathode to form a membrane electrode assembly (MEA) which is further layered between diffusion layers that allow both gaseous reactant flow to and electric current flow from the MEA. The aforementioned catalyst layer may be disposed on or as part of the diffusion layer or the membrane.

To increase electrical output, individual fuel cell units are stacked with bipolar plates disposed between the diffusion layer and anode electrode of one MEA and the diffusion layer and cathode electrode of an adjacent MEA. Typically, the bipolar plates are made from an electrically-conductive material in order to form an electrical pathway between the MEA and an external electric circuit. In such a stacked configuration, the bipolar plates separating adjacently-stacked MEAs have opposing surfaces each of which include flow channels separated from one another by raised lands. The channels act as conduit to convey hydrogen and oxygen reactant streams to the respective anode and cathode of the MEA, while the lands, by virtue of their contact with the electrically conductive diffusion layer that is in turn in electrical communication with current produced at the catalyst sites, act as a transmission path for the electricity generated in the MEA. In this way, current is passed through the bipolar plate and the electrically-conductive diffusion layer.

Fuel cells convert a fuel into usable electricity via chemical reaction. A significant benefit to such an energy-producing means is that it is achieved without reliance upon combustion as an intermediate step. As such, fuel cells have several environmental advantages over internal combustion engines (ICEs) and related power-generating sources. In a typical fuel cell (such as a proton exchange membrane or polymer electrolyte membrane (in either event PEM) fuel cell), a pair of catalyzed electrodes are separated by a polysulfonated or related medium (such as Nafion™) such that an electrochemical reaction may occur when an ionized form of a reducing agent (such as hydrogen, $H_2$) introduced through one of the electrodes (the anode) crosses the ion-transmissive medium and combines with an ionized form of an oxidizing agent (such as oxygen, $O_2$) that has been introduced through the other electrode (the cathode). Upon combination at the cathode, the ionized hydrogen and oxygen form water. The electrons that were liberated in the ionization of the hydrogen proceed in the form of direct current (DC) to the cathode via external circuit that typically includes a load. The flow of this DC energy is the basis for power generation by the fuel cell.

Fuel cells and associated electrical systems must be protected against short circuits to prevent components and wiring from overheating and being damaged. Usually this is accomplished by using fuses, and/or circuit breakers, or other protection devices such as surge protectors. The unique short circuit characteristics of a fuel cell stack prevent passive overcurrent protection devices such as fuses and/or circuit breakers from being effective solutions. Therefore, active techniques whereby a short circuit is detected by the controls system and cleared by commanding a switching device open are necessary. It is desirable to have multiple methods of detecting short circuit events so that the failure of any single method does not result in failure of the overcurrent protection system.

SUMMARY

In one embodiment, an apparatus to detect a fuel cell system short circuit event may include a first sensor electrically coupled to a power output of a fuel cell and configured to sense a first current; a second sensor electrically coupled to the power output of the fuel cell and configured to sense a second current; and a third sensor electrically coupled to the power output of the fuel cell and configured to sense a voltage. The apparatus may also include a controller electrically coupled to the first sensor, second sensor, and third sensor and configured to measure the first current, the second current, and the voltage and execute an algorithm in a computer readable medium to indicate a short circuit event when at least one of the first current crosses a first threshold value, the second current crosses a second threshold value, or the voltage crosses a third threshold value. The fuel cell system does not require a dedicated short circuit event sensor.

In another embodiment. a method of determining a short circuit event in a fuel cell system may include sensing a first current using a first sensor electrically coupled to a power output of a fuel cell; sensing a second current using a second sensor electrically coupled to the power output of the fuel cell; and sensing a voltage using a third sensor electrically coupled to the power output of the fuel cell. Measuring the first current, the second current, and the voltage using a controller electrically coupled to the first sensor, second sensor, and third sensor and executing an algorithm in a computer readable medium to indicate a short circuit event when at least one of the first current crosses a first threshold value, the second current crosses a second threshold value, or the voltage crosses a third threshold value.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The method and device disclosed herein involve monitoring the output of multiple existing sensors of a fuel cell system of a vehicle to sense if their outputs are indicative of the short circuit event. If a short circuit event is indicated, the On-board Computer Module (OCM) may alert the user and take remedial action to limit damage to the vehicle. Various embodiments of the device and the operation of the device will be described in more detail herein.

Figure 1:
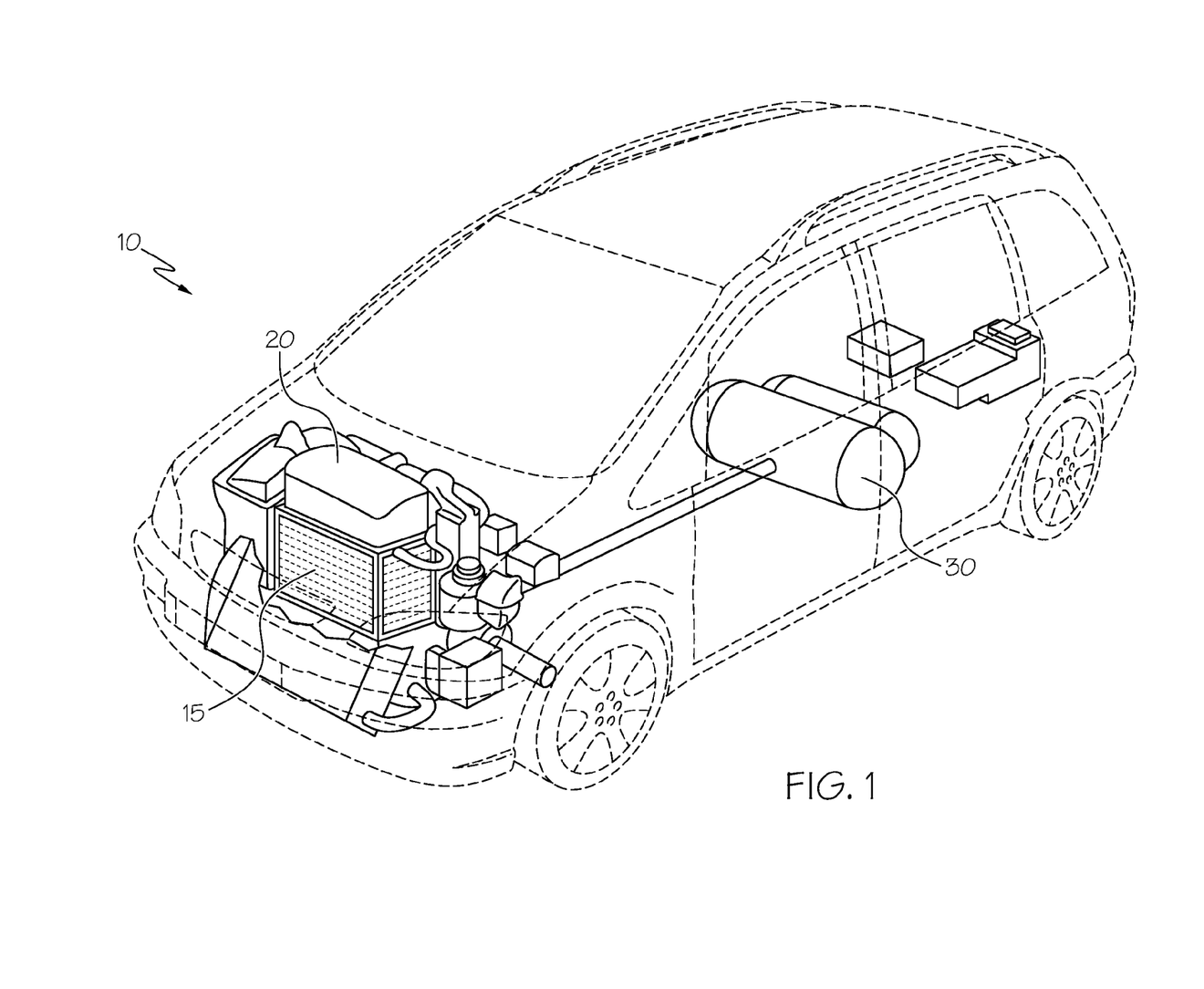
FIG. 1 depicts a vehicle with a fuel cell stack according to one or more embodiments shown and described herein.
Figure 2:
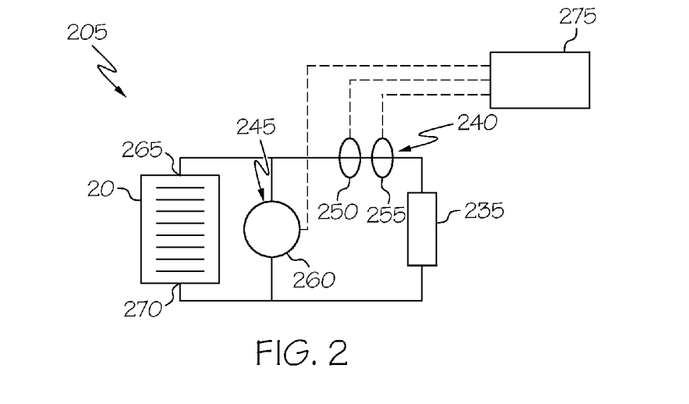
FIG. 2 depicts a simple electrical circuit of the fuel cell system of FIG. 1 according to one or more embodiments shown and described herein.

Referring to FIG. 1, a vehicle 10 (e.g., a car, bus, truck, or motorcycle) is shown and may be powered by the fuel cell system 205 (FIG. 2). Some components of the fuel cell system 205 may include numerous fuel cells 15 (preferably arranged as one or more stacks 20) that convert stored gaseous fuel from a tank 30 into electricity to provide electric power to a load 235 (FIG. 2) which may include a motor (not shown) and/or an engine (not shown) and/or other vehicle electrical systems. The engine may be a fully electric or a hybrid electric engine (e.g., an engine that uses both electricity and petroleum-based combustion for propulsion power). The load 235 may include a propulsion system (not shown) to utilize the power from the fuel cell system to propel the vehicle 10. The fuel cell system 205 may also include any number of valves, compressors, tubing, temperature regulators, electrical storage devices (e.g., batteries, ultra-capacitors or the like), and controllers to deliver the fuel from the tank 30 or tanks to the fuel cell system 205, as well as to provide control over the operation of fuel cell system 205. Such controllers will be discussed in more detail below.

Any number of different types of one or more fuel cells 15 may be used in the fuel cell system 205 (e.g., metal hydride fuel cells, alkaline fuel cells, electrogalvanic fuel cells, or any other type of known fuel cells). One or more fuel cells 15 may also be combined in series and/or parallel within the fuel cell system 205 in the stack 20 in order to produce a higher voltage and/or current yield by the fuel cell system 205. The produced electrical power may be supplied directly to a motor (not shown) or stored within an electrical storage device (not shown) for later use by vehicle 10.

Figure 3:
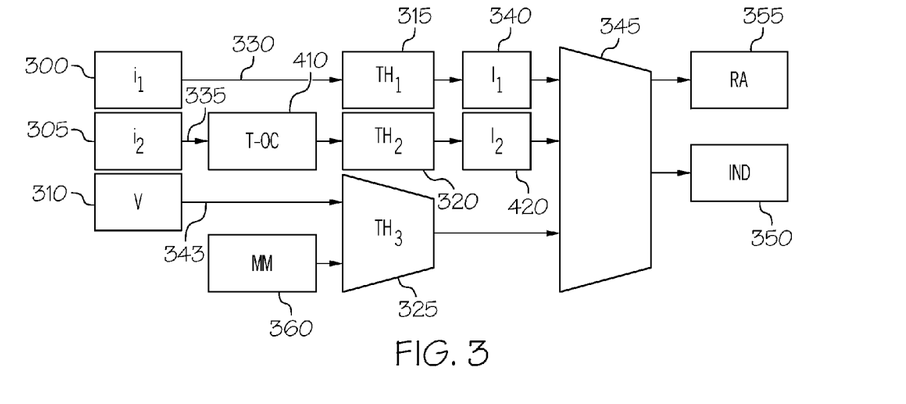
FIG. 3 illustrates an algorithm used by a controller according to one or more embodiments shown and described herein.

FIG. 2 illustrates a simple electrical circuit of the fuel cell system 205. The stack 20 provides electrical energy or power for the load 235 of the vehicle 10 (FIG. 1). The load 235 may be one or more electrical systems (not shown) of the vehicle 10 to include the traction motor, propulsion system auxiliaries such as pumps, navigation systems, instrumentation, lighting, and signaling. A controller 275 may use one or more sensors to monitor the status of the fuel cell system 205. The sensors may include one or more current sensors 240 and/or one or more voltage sensors 245. The current sensors 240 may include one or more Hall Effect sensors and/or one or more induction sensors and combinations thereof. In some embodiments, a first sensor 250, a second sensor 255, and a third sensor 260 are electrically coupled to a power output of the stack 20. The power output is the energy or power provided by the stack 20 to a load 235 between an anode 265 and a cathode 270 of the stack 20. The power output manifests itself as a voltage of the stack 20 and a current of the stack 20. The first sensor 250 may be a direct current (DC) current sensor or more preferably a Hall Effect sensor electrically coupled to the power output of the stack 20 and configured to sense a first current 300 (FIG. 3). The second sensor 255 may be an alternating current (AC) current sensor or more preferably an induction sensor electrically coupled to the power output of the stack 20 and configured to sense a second current 305 (FIG. 3). The third sensor 260 may be a voltage sensor electrically coupled to the power output of the stack 20 and configured to sense a voltage 310 (FIG. 3). The controller 275 may be electrically coupled to the first sensor 250, the second sensor 255, and/or the third sensor 260. In some embodiments, the first current 300 and the second current 305 may be the same current and equal in magnitude to the current of the stack 20.

In some embodiments, the first sensor 250, second sensor 255, and third sensor 260 may be used for other sensing functions within the fuel cell system 205. The three sensors may be monitored by the controller 275 to detect a short circuit event, but that is not the three sensors primary purpose. For example, the first sensor 250 may be used to monitor the power output of the stack 20. The second sensor 255 may be used to monitor a high frequency resistance (HFR) of the stack 20 and the third sensor 260 may be used to monitor the voltage output of the stack 20. There is no need for a dedicated short circuit event sensor as the first sensor 250, second sensor 255, and the third sensor 260 double up for both a primary purpose (stack monitoring) and a secondary purpose (short circuit event monitoring). As such, the additional cost and complexity associated with redundant sensing hardware is avoided.

The use of multiple sensors enables the fuel cell system 205 to have redundancy in detecting a short circuit event. If one sensor should fail, one or more other sensors may still be operational to detect a short circuit event. Each sensor monitors a different aspect of the fuel cell system 205. Therefore, a short circuit event may not disable all the sensors depending on where the short circuit event takes place in the fuel cell system 205.

FIG. 3 illustrates an algorithm used by the controller 275 of FIG. 2. The controller 275 may include the algorithm encoded within or on a computer readable medium or memory. The controller 275 may execute the algorithm to indicate (IND) 350 a short circuit event to either a user (not shown) of the vehicle 10 or the OCM (not shown) or both. The controller 275 may also use the algorithm to determine when remedial action (RA) 355 should be taken. The short circuit event is a condition of the fuel cell system 205 of FIG. 2 where the current from the stack 20 exceeds the design parameters of the fuel cell system 205 and/or alternatively the voltage of the stack 20 drops below design parameters. The short circuit event could cause damage to the fuel cell system 205 if remedial actions are not taken to clear and/or stop the short circuit event. To clear a short circuit event, either the electrical circuit including the short circuit must be broken or interrupted or the production of electricity must stop. Remedial actions may address those two ways of clearing a short circuit through numerous methods and apparatuses known in the art.

Some examples of remedial actions may include: opening contactors that disconnect the stack 20 from the fuel cell system 205 and/or discontinuing the flow of reactant hydrogen and air to the fuel cell system 205.

In some embodiments, the controller 275 may be configured to measure the sensed first current ($i_1$) 300 and determine a first value 330; to measure the sensed second current ($i_2$) 305 and determine a second value 335; and to measure the sensed voltage (v) 310 and determine a third value 343. The algorithm may run a comparator algorithm 345 to determine if the first value 330, second value 335 and/or the third value 343 may deviate from normal operating conditions. In some embodiments, the comparator algorithm 345 may compare the first value 330 to a first threshold value 315 and indicate 350 the short circuit event when the first value 330 crosses the first threshold value ($TH_1$)315. Furthermore, the comparator algorithm 345 may compare the second value 335 to a second threshold value ($TH_2$)320 and indicate 350 the short circuit event when the second value 335 crosses the second threshold value 320 and the comparator algorithm 345 may compare the third value 343 to a third threshold value ($TH_3$)325 and indicate 350 the short circuit event when the third value 343 crosses the third threshold value 325. In addition to indicating 350 the short circuit event, the comparator algorithm 345 may signal remedial action 355 to be taken by the OCM. A threshold value is crossed when the value being compared to the threshold value either equals the threshold value, exceeds the threshold value, or conversely falls below the threshold value.

Figure 4:
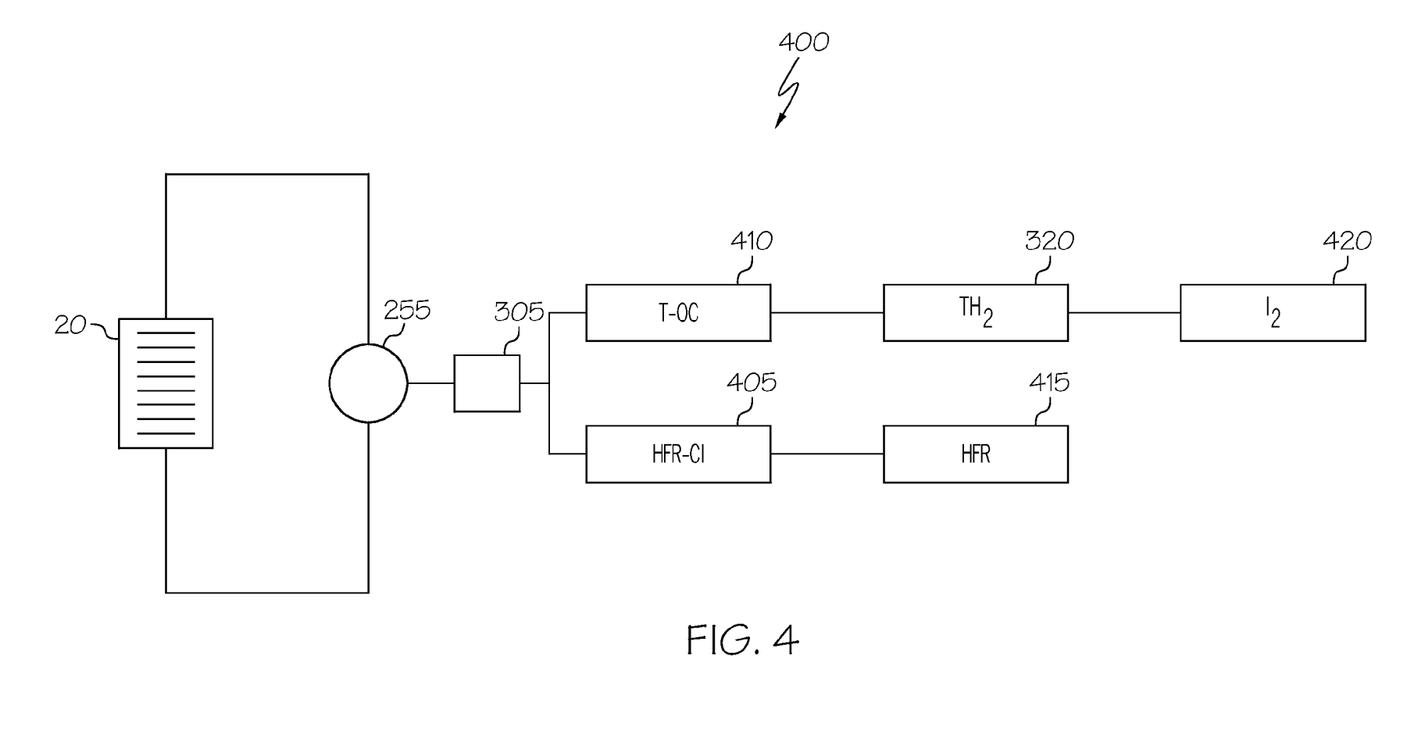
FIG. 4 illustrates a second sensor used to detect a high frequency resistance according to one or more embodiments shown and described herein.

Referring to FIGS. 3 and 4, in one embodiment, the second sensor 255 may be electrically coupled to the power output of the fuel cell 15 used to detect the HFR. The second sensor 255 may be an existing induction sensor or more preferably a Rogowski coil. A pair of integrator circuits 400 may be used to perform the mathematical operation of integration of the sensed second current 305 with time. A HFR current integrator (HFR-CI) 405 may be used to provide a waveform of sensed second current 305 vs time for use in a HFR computation (HFR) 415 for the fuel cell system 205 in FIG. 2. The HFR current integrator 405 may use a high gain for use in the HFR computation 415. A tuned over current (OC) integrator (T-OC) 410 may be used to perform the same integration of the sensed second current 305 using a low gain. The use of the low gain may provide increased margin between the sensing of the short circuit event and the expected HFR ripple current on the power output of the stack 20.

The HFR ripple current may be differentiated from the short circuit event through the use of sensors and electrical characteristics of HFR ripple current versus short circuit event. For example, two characteristics distinguish the short circuit event from the HFR ripple current. The first is the waveform. The HFR ripple is a sinusoidal waveform and the short circuit event waveform is an exponential waveform. The second is the magnitude of the amplitude. The short circuit event may be as large as about forty times than the HFR ripple current magnitude. The integrators (HFR current integrator 405 and the tuned OC integrator 410) are integral to differentiating the short circuit event from the HFR ripple current. The tuning of the integrators refers to the adjustment of the integrator gains to recover the original waveforms of the current they are electrically coupled to. The HFR current integrator 405 is optimized using a high gain to recover the HFR ripple current. The HFR current integrator 405 may be overwhelmed when presented with a short circuit event. Thus a low gain integrator may be optimal to detect and latch onto a short circuit event. The controller 275 may determine if the tuned OC integrator 410 output (second value 335 in FIG. 3) crosses the second threshold value 320 to indicate a short circuit event. A second latch 420 may be used to maintain second value 335 sensed by the second sensor 255.

Referring back to FIG. 3, in some embodiments, the controller 275 may require two or more of the threshold values (first threshold value 315, second threshold value 320, and/or third threshold value 325) to be crossed before the short circuit is indicated 350 and/or to signal remedial action 355 to be taken. The comparator algorithm 345 may sense when the first value 330, the second value 335 and/or the third value 343 are present and indicate 350 the short circuit event and/or signal remedial action 355 to be taken by the OCM when two or more values are present. Alternatively, a first latch ($l_1$) 340 and the second latch ($l_2$)420 may be used to maintain the first value 330 and the second value 335 indication until reset. The first latch 340 and the second latch 420 are advantageous to ensure the indication 350 and/or the signal of remedial action 355 when a short duration high current event may occur or when a short duration low voltage event may occur. The first latch 340 maintains the first value 330 when the first value 330 crosses the first threshold and the second latch 420 maintains the second value 335 when the second value 335 crosses the second threshold. A short duration high current event may occur when an intermittent short circuit event is present or more specifically to capture the peak 610 (FIG. 6) of the short circuit event over a very short duration of time. The short duration low voltage event would correlate with the short duration high current event through Ohm's law such that the short circuit event would also manifest itself as a low voltage value as described below. The first latch 340 and the second latch 420 may be reset upon turning off the vehicle 10, a reset command given by the OCM (not shown), or after a duration of time has passed. The first latch 340 and the second latch 420 may be each be a separate circuit, application specific integrated circuit (ASIC), or a software implementation within the computer readable medium of the controller 275 or algorithm.

Figure 5:
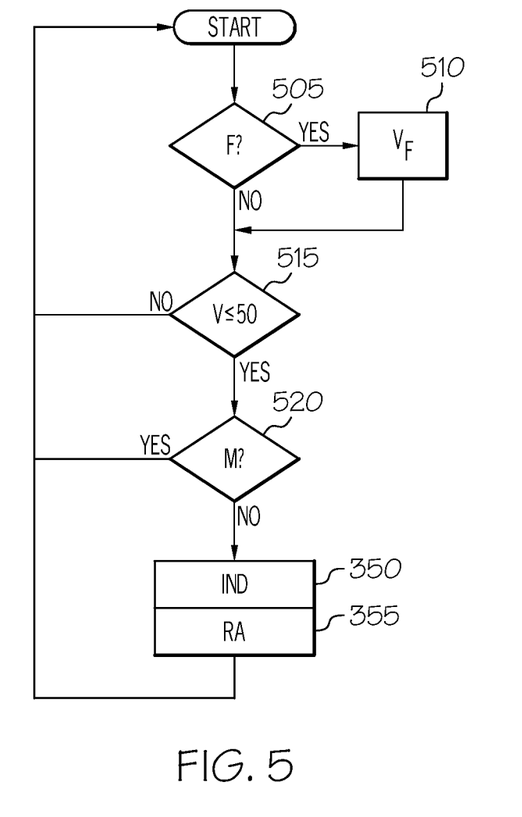
FIG. 5 illustrates a mode manager according to one or more embodiments shown and described herein.

FIG. 5 illustrates how a mode manager (MM) 360 may be used to determine if the low voltage value of the fuel cell system 205 is a result of a short circuit event or normal operation of the vehicle 10. The mode manager 360 may be used to enable the third value 343 to be present for use by the comparator algorithm 345 as described above for FIG. 3. The mode manager 360 may be part of the controller 275 and electrically coupled to a Fuel Cell Stack (FCS) Mode Manager (not shown). The mode manager 360 may receive the specific mode from the Fuel Cell Stack (FCS) Mode Manager which may be coupled to the OCM (not shown). The mode manager 360 enables the third value 343 to be present only when the vehicle 10 of FIG. 1 is operating in a run mode. The mode manager will disable the third value 343 from being present when the vehicle 10 is in a non-run mode, for example during initial start-up of the system, normal shutdown of the system, and/or standby mode. The standby mode may, for example, be used when the vehicle 10 is stopped during normal drive conditions, e.g. stopped at a traffic light. A low voltage value of the stack 20 may be indicative of a short circuit event or it may be the result of the power consumption of the load 235 of the fuel cell system 205 in FIG. 2 depending on which mode the vehicle 10 is operating in. In other words, as the current of the stack 20 increases in magnitude due to either a short circuit event or usage by the load 235, the voltage will drop proportionally in accordance with Ohm's law. A large drop and/or a quick drop in voltage of the stack 20 may be another indication of a short circuit event but the drop in voltage may not be a lone indicator of the short circuit event. For example, the vehicle 10 may be in a drive mode where the voltage from the stack 20 may be lower than normal due to use by a propulsion system but the lower voltage is not indicative of a short circuit event. The mode manager 360 would signally communicate to the controller 275 that the vehicle 10 is in a propulsion mode and a low voltage value sensed by the third sensor 260 is to be expected.

Referring to FIG. 5 in detail, the first step is to determine if the stack 20 is faulted (F) 505. If the stack 20 is faulted, the controller 275 may use a fault voltage ($V_F$) 510 for the voltage of the stack 20 for the next step. If the stack 20 is not faulted, the controller 275 may use an existing voltage for the voltage of the stack 20 for the next step. The next step is to determine if the voltage (V) of the stack 20 is below about 50 volts 515. If the voltage of the stack 20 is not below about 50 volts, the controller 275 will restart to sense if the stack 20 is faulted. If the voltage of the stack 20 is below about 50 volts, the mode manager 360 of the controller 275 may communicate with the FCS mode manager through communication protocols available in the automotive realm, to read which mode (M) 520 the vehicle 10 is currently operating in. If the vehicle 10 is in a specific mode as described above, the controller 275 may restart to sense if the stack 20 is faulted. If the vehicle 10 is not currently operating in a specific mode, the controller 275 will indicate 350 a short circuit event as described above. In addition to indicating (IND) 350 the short circuit event, the controller 275 may signal remedial action (RA) 355 to be taken by the OCM.

Figure 6:
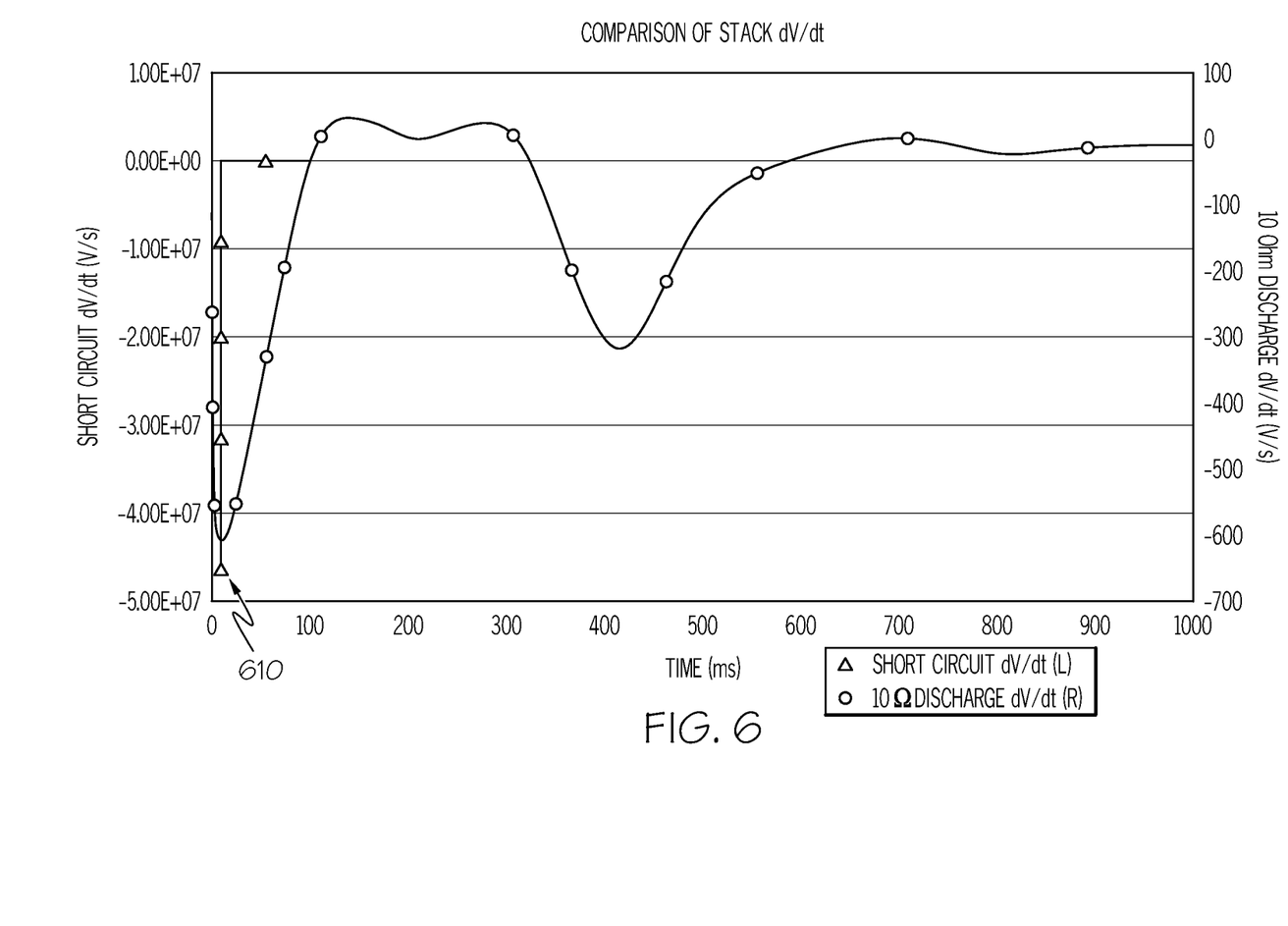
FIG. 6 plots a short circuit event according to one or more embodiments shown and described herein.

FIG. 6 plots the short circuit event (triangle) vs a quick discharge (circle) through a 10-ohm load of the fuel cell system 205 of FIG. 2. The short circuit event (triangle) is an extreme magnitude event over a very short duration. By comparison, the quick discharge (circle) is also a large magnitude event, but over a longer duration with a ripple voltage shown after about 50 milliseconds. The short circuit event (triangle) exceeds the quick discharge (circle) by at least four orders of magnitude as is shown by the peak 610 of the short circuit event and is illustrative of exceeding the designed parameters of the fuel cell system 205. The controller 275 from FIG. 2 may need a method to distinguish between the short circuit event and a quick discharge of the fuel cell system 205. One way to accomplish this may be done by a mask algorithm in the computer readable medium executed by the controller 275 where the short circuit event (triangle) is distinguished due to the four orders of magnitude difference in the initial peak as described below. The mask algorithm uses a predetermined voltage and a predetermined rate of change to distinguish short circuit event from the quick discharge of the fuel cell system 205.

Figure 7:
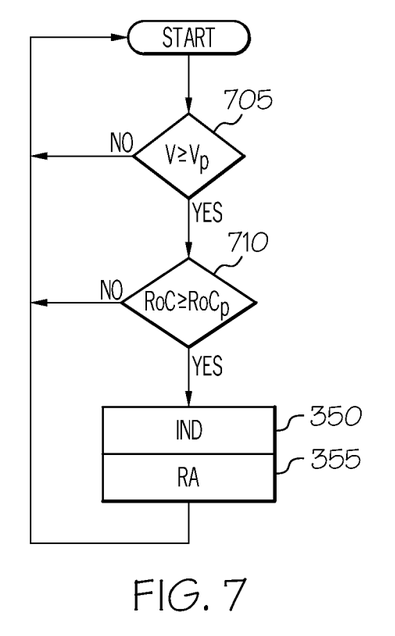
FIG. 7 illustrates a detection of method using a mask algorithm event according to one or more embodiments shown and described herein.

FIG. 7 illustrates a detection of method using the mask algorithm to distinguish between the short circuit event (triangle) and a quick discharge of the stack (circle) as shown in FIG. 6. First, the controller 275 of FIG. 2 senses if the change in voltage (V) 705 of the stack 20 is greater than the predetermined voltage ($V_p$). The change in voltage 705 is not greater than the predetermined voltage, the controller 275 restarts to sense the voltage of the stack 20. If the change in voltage 705 is greater than the predetermined voltage, the controller 275 compares the rate of change (RoC) 710 of the voltage of the stack 20 versus the duration to see if it less than the predetermined rate of change ($RoC_p$). If the rate of change 710 of the voltage of the stack 20 is not less than the predetermined rate of change, the controller 275 restarts to sense the voltage of the stack 20. If the rate of change 710 of the voltage of the stack 20 is less than the predetermined rate of change then the controller 275 indicates 350 the short circuit event as described in FIG. 3. In addition to indicating 350 the short circuit event, the controller 275 may signal remedial action 355 to be taken by the OCM.

For example, the controller 275 may use a predetermined voltage of about 30 volts and a predetermined rate of change of about 1e7 volts/second. The predetermined voltage and predetermined rate of change are determined by the specific characteristics of the stack 20.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

The present disclosure may be embodied in hardware and/or in software (including firmware, resident software, microcode, etc.). The system controller 275 may have at least one processor and the computer-readable medium. A computer-usable or the computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber (example of propagation medium), and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present disclosure may be written in a high-level programming language, such as C or C++, for development convenience. In addition, computer program code for carrying out operations of the present disclosure may also be written in other programming languages, such as, but not limited to, interpreted languages. Some modules or routines may be written in assembly language or even micro-code to enhance performance and/or memory usage. However, software embodiments of the present disclosure do not depend on implementation with a particular programming language. It will be further appreciated that the functionality of any or all of the program modules may also be implemented using discrete hardware components, one or more application specific integrated circuits (ASICs), or a programmed digital signal processor or microcontroller.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An apparatus to detect a fuel cell system short circuit event, the apparatus comprising:

a first sensor electrically coupled to a power output of a fuel cell and configured to sense a first current;

a second sensor electrically coupled to the power output of the fuel cell and configured to sense a second current;

a third sensor electrically coupled to the power output of the fuel cell and configured to sense a voltage; and a controller electrically coupled to the first sensor, the second sensor, and the third sensor and configured to measure the first current, the second current, and the voltage and execute an algorithm in a computer readable medium to indicate a short circuit event when at least one of the first current crosses a first threshold value, the second current crosses a second threshold value, or the voltage crosses a third threshold value.

2. The apparatus of claim 1, wherein the controller will require two or more threshold values to be crossed before indicating the short circuit event.

3. The apparatus of claim 2, further comprising:
a first latch that maintains a first value when the first current crosses the first threshold value; and
a second latch that maintains a second value when the second current crosses the second threshold value.

4. The apparatus of claim 3, wherein the first latch and the second latch are programmed into the algorithm.

5. The apparatus of claim 4, wherein the first latch and the second latch are separate circuits in the fuel cell system and electrically coupled to the controller.

6. The apparatus of claim 1, further comprising a mode manager to enable the sensing of the voltage wherein the mode manager will enable the sensing of the voltage when in a run mode and the mode manager will disable the sensing of the voltage when in a non-run mode.

7. The apparatus of claim 1, wherein the controller will signal to take remedial action when the short circuit event is indicated.

8. The apparatus of claim 7, further comprising a set of contactors electrically coupled to the power output of the fuel cell and the set of contactors are opened when the controller signals to take remedial action.

9. The apparatus of claim 1, further comprising a tuned over current integrator electrically coupled to the second sensor which is configured as an alternating current sensor to measure a high frequency resistance current within the fuel cell, the second sensor and the tuned over current integrator cooperative with the controller to indicate the short circuit event when the controller senses the short circuit event from the tuned over current integrator.

10. The apparatus of claim 1, wherein the fuel cell system does not require a dedicated short circuit event sensor.

11. A method of determining a short circuit event in a fuel cell system, the method comprising:

sensing a first current using a first sensor electrically coupled to a power output of a fuel cell;

sensing a second current using a second sensor electrically coupled to the power output of the fuel cell;

sensing a voltage using a third sensor electrically coupled to the power output of the fuel cell;

measuring the first current, the second current, and the voltage using a controller electrically coupled to the first sensor, the second sensor, and the third sensor; and executing an algorithm in a computer readable medium to indicate the short circuit event when at least one of the first current crosses a first threshold value, the second current crosses a second threshold value, or the voltage crosses a third threshold value.

12. The method of claim 11, wherein the controller will require two or more threshold values to be crossed before indicating the short circuit event.

13. The method of claim 12, further comprising:
retaining a first value using a first latch when the first current crosses the first threshold value; and
retaining a second value using a second latch when the second current crosses the second threshold value.

14. The method of claim 13, wherein the first latch and the second latch are programmed into the algorithm.

15. The method of claim 13, wherein the first latch and the second latch are separate circuits in the fuel cell system and are electrically coupled to the controller.

16. The method of claim 11, further comprising:
enabling the sensing of the voltage using a mode manager when in a run mode; and
disabling the sensing of the voltage using the mode manager when in a non-run mode.

17. The method of claim 11, wherein the controller will signal to take remedial action when the short circuit event is indicated.

18. The method of claim 17, further comprising opening a set of contactors electrically coupled to the power output of the fuel cell when the controller signals to take remedial action.

19. The method of claim 11, further comprising:
sensing a high frequency resistance current sensed by the second sensor which is configured as an alternating current sensor; and
indicating an over current condition to the controller using a tuned over current integrator electrically coupled to the alternating current sensor and the second sensor and the tuned over current integrator are cooperative with the controller.

20. The method of claim 11, wherein the fuel cell system does not require a dedicated short circuit event sensor.

* * * * *